(12) United States Patent
Komatsubara

(10) Patent No.: US 11,013,212 B2
(45) Date of Patent: May 25, 2021

(54) BED COVER FOR PET BED

(71) Applicant: UNICHARM CORPORATION, Ehime (JP)

(72) Inventor: Daisuke Komatsubara, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 372 days.

(21) Appl. No.: 16/073,800

(22) PCT Filed: Feb. 5, 2016

(86) PCT No.: PCT/JP2016/053571
§ 371 (c)(1),
(2) Date: Jul. 29, 2018

(87) PCT Pub. No.: WO2017/130423
PCT Pub. Date: Aug. 3, 2017

(65) Prior Publication Data
US 2019/0029218 A1 Jan. 31, 2019

(30) Foreign Application Priority Data
Jan. 29, 2016 (JP) .............................. JP2016-016611

(51) Int. Cl.
*A01K 1/035* (2006.01)
*A01K 1/015* (2006.01)

(52) U.S. Cl.
CPC .......... *A01K 1/0353* (2013.01); *A01K 1/0157* (2013.01)

(58) Field of Classification Search
CPC ............................ A01K 1/0353; A01K 1/0135
See application file for complete search history.

(56) References Cited

U.S. PATENT DOCUMENTS 5,136,981 A * 8/1992 Barreto, III .......... A01K 1/0353
119/28.5
5,588,393 A * 12/1996 Heilborn .............. A01K 1/0353
119/28.5
(Continued)

FOREIGN PATENT DOCUMENTS

DE 202004008487 U1 9/2004
JP H3-27661 U 3/1991
(Continued)

OTHER PUBLICATIONS

International Search Report for PCT/JP2016/053571, dated Mar. 29, 2016, 4pp.

*Primary Examiner* — Monica L Barlow
(74) *Attorney, Agent, or Firm* — Hauptman Ham, LLP

(57) ABSTRACT

A bed cover to be placed on a pet bed having a frame body and a block body detachably inserted into the frame body includes: a sheet-like member which has, in a plan view in an extended state, a center section located at the center of the bed cover and an extending section extending from the center section in a direction towards the outer edge of the sheet-like member; a holding member which is provided on a first surface or a second surface of the center portion of the sheet-like member and holds the block body; and an attachment member which is provided at the extending section of the sheet-like member and allows the bed cover to be detachably attached to the frame body.

6 Claims, 7 Drawing Sheets

(56) References Cited

U.S. PATENT DOCUMENTS

| | | | |
|---|---|---|---|
| 5,765,502 A * | 6/1998 | Haugh | A01K 1/0353 119/28.5 |
| 5,784,995 A * | 7/1998 | Willinger | A01K 1/0353 119/28.5 |
| 6,968,806 B2 | 11/2005 | Helwig | |
| 7,373,900 B2 | 5/2008 | Duncan | |
| 2003/0075111 A1 | 4/2003 | Greenfield | |
| 2004/0216680 A1 | 11/2004 | Lamstein | |
| 2007/0289537 A1 | 12/2007 | Duncan | |

FOREIGN PATENT DOCUMENTS

| | | |
|---|---|---|
| JP | 3065449 U | 2/2000 |
| JP | 2003-27368 A | 1/2003 |
| JP | 2005-256255 A | 9/2005 |
| JP | 3130810 U | 4/2007 |
| JP | 2007-174991 A | 7/2007 |
| JP | 1422604 B2 | 2/2010 |
| JP | 3201356 U | 12/2015 |
| JP | 3202245 U | 1/2016 |
| NL | 1002889 C1 | 5/1997 |

* cited by examiner

BED COVER FOR PET BED

RELATED APPLICATIONS

The present application is a National Phase of International Application No. PCT/JP2016/053571, filed Feb. 5, 2016 and claims priority of Japanese Patent Application No. 2016-016611, filed Jan. 29, 2016.

FIELD

The present invention relates to a bed cover for a pet bed to be used when keeping a pet such as a dog.

BACKGROUND

Pet beds for napping pets such as dogs and cats are known which are provided with an annular frame body having a recess on the inside and a cushion body fitted in the recess. Such pet beds can have their cushion bodies removed for washing, thereby allowing a hygienic condition to be maintained.

Hygienic pet beds are also known which are pet beds provided with covers that can be removed for washing. Examples of such pet beds include the pet bed proposed in PTL 1, which has a ring-shaped frame member situated in the bottom part of a cover that forms a bag shape, and an opening for insertion and removal of the frame member disposed at the center location of the frame member, wherein the cover is folded inside so that the region from the outer peripheral surface to the inner peripheral surface of the frame member is covered by the cover, the remaining cover fabric including the opening being spread over the bottom part in the cover to construct a main bed body having a recess inside it, while a block body having essentially the same planar shape as the recess is fitted into the recess.

The pet bed disclosed in PTL 1 allows the frame member to be inserted and removed through the opening in the cover even without using an attachment/detachment member such as a fastener, and during use, it can be blocked by the block body situated at the seat location without exposing the remaining cover fabric that includes the opening, so that sewing cost can be minimized and washing operation can also be facilitated, for a more hygienic bed.

CITATION LIST

Patent Literature

[PTL 1] Japanese Patent Publication No. 4422604

SUMMARY

Technical Problem

However, with merely a construction such as that of the pet bed of PTL 1 in which a block body is inserted as a separate member on the frame body on which the bag-like cover is fitted, since the block body is not anchored to the frame body, when a pet such as a dog scratches the bottom face of the recess of the pet bed (i.e., the outer surface on the top side of the block body) (due to hole-digging behavior by the pet, for example), the claws of the pet often catch onto the bottom face of the recess or the groove at the border section between the block body and the frame body, resulting in shifting or detachment of the block body from the frame body.

Alternatively, the pet bed as a whole, constructed by inserting the block body in the frame body, may be covered from the top side of the bed with the cover, but even if the bed is covered with the cover it may still be the case that the frame body protrudes further out to the top side than the block body, forming a gap between the cover and the block body, and therefore when the pet scratches the bottom face of the recess of the pet bed as described above, part of the cover moves along with movement of the claws of the pet, while the gap can also potentially function as a space allowing movement of the block body, such that the claws of the pet still catch onto the bottom face of the recess or the groove at the border section between the block body and the frame body, often resulting in shifting or detachment of the block body from the frame body.

It is therefore an object of the present invention to provide a bed cover which is fitted onto a pet bed having a frame body and a block body detachably inserted into the frame body, wherein the block body is less likely to be displaced or detach from the frame body when fitted onto the pet bed.

Solution to Problem

One aspect (aspect 1) of the invention is a bed cover to be fitted onto a pet bed having a frame body and a block body detachably inserted into the frame body, wherein the bed cover comprises:

a sheet-like member which has a first surface forming the outer surface and a second surface on the opposite side from the first surface, when fitted onto the pet bed, and which has, in a plan view in the extended state, a center section located at the center of the bed cover, and an extending section extending from the center section in a direction towards the outer edge of the sheet-like member, a holding member which is provided on either the first surface or second surface of the center section of the sheet-like member and serves to hold the block body, and an attachment member which is provided at the extending section of the sheet-like member and serves to allow the bed cover to be attached to the frame body in a freely detachable manner Since the bed cover of aspect 1 comprises a holding member that serves to hold the block body of the pet bed, when the bed cover is fitted onto the pet bed, a gap is less likely to form between the bed cover and the block body, and the range of movement of the block body can be restricted, thus minimizing displacement or detachment of the block body from the frame body.

In addition, since the bed cover of aspect 1 comprises an attachment member for attachment of the bed cover to the frame body of the pet bed, when the bed cover is fitted onto the pet bed, the bed cover is anchored to the frame body of the pet bed and is less likely to move, and consequently the block body held by the bed cover is also less likely to move (i.e., it is less likely to be displaced or detached from the frame body).

Thus, even when a pet such as a dog scratches the bottom face of the recess of the pet bed (i.e., the outer surface on the top side of the block body) (due to hole-digging behavior of the pet, for example) when the bed cover of aspect 1 has been fitted onto the pet bed, the block body is less likely to be displaced or detached from the frame body.

As used herein, "the block body is displaced from the frame body" means that at least part of the block body changes from a state in which the block body is completely inserted in the frame body, to a state in which the block body is displaced in the direction of detachment from the frame body (for example, upward) while not being completely detached from the frame body, and "the block body detaches from the frame body" means that at least part of the block body changes from a state in which the block body is completely inserted in the frame body or a state in which the block body is displaced from the frame body, to a state in which it is completely detached from the frame body (i.e., a state of complete separation from the frame body).

According to another aspect (aspect 2) of the invention, the bed cover of aspect 1 has the holding member provided on the second surface at the center section of the sheet-like member.

Since the bed cover of aspect 2 has the holding member provided on the second surface at the center section of the sheet-like member, even when a pet has stepped onto the bed (especially onto the outer surface on the top side of the frame body) and the bed cover has been pulled to the outer side in the horizontal surface direction of the bed cover, force in the direction of detachment from the frame body (the upward direction) is less likely to be generated on the block body held by the bed cover and displacement or detachment of the block body from the frame body is even less likely to occur.

Furthermore, when the bed cover of aspect 2 is fitted onto the pet bed, the outer surface on the top side of the bed is formed by the first surface of the center section and extending section of the sheet-like member forming the bed cover, and the groove-like border section between the frame body and the block body forming the bed is not exposed on the outer surface, such that, according to the bed cover of aspect 2, even when a pet has scratched the outer surface on the top side of the bed, the claws of the pet are less likely to enter the groove-like border section, and displacement or detachment of the block body from the frame body can be more reliably prevented.

According to another aspect (aspect 3) of the invention, in the bed cover of aspect 2, the center section of the sheet-like member has a stretchable property.

Since the center section of the sheet-like member of the bed cover of aspect 3 has a stretchable property, even when a pet has stepped onto the bed and force acts causing the bed cover to be pulled to the outer side in the horizontal surface direction of the bed cover, the center section that has a stretchable property buffers the force so that it is not transmitted to the block body being held in the bed cover, and displacement or detachment of the block body from the frame body is even less likely to occur.

According to another aspect (aspect 4) of the invention, in the bed cover of any one of aspects 1 to 3, the holding member is a housing member for housing of the block body, and the housing member has an opening for insertion of the block body.

Since the holding member of the bed cover of aspect 4 is a housing member having an opening for housing of the block body (for example, a pocket), which allows the block body to be held more reliably, the block body is even less likely to separate from the bed cover and be displaced or detached from the frame body.

According to another aspect (aspect 5) of the invention, in the bed cover of any one of aspect 2 or 3, the holding member is a stretchable housing member for housing of the block body, and the stretchable housing member has an opening for insertion of the block body.

Since the holding member of the bed cover of aspect 5 is a stretchable housing member for housing of the block body (for example, a stretchable pocket), it can exhibit the same effect as aspect 4, and even when a pet has stepped onto the bed and force acts causing the bed cover to be pulled to the outer side in the horizontal surface direction of the bed cover, the stretchable housing member stretches, buffering the force so that it is not transmitted to the block body being held in the bed cover, and helping to more reliably prevent displacement or detachment of the block body from the frame body.

According to another aspect (aspect 6) of the invention, in the bed cover of any one of aspects 1 to 5, the extending section of the sheet-like member has a stretchable property.

Since the extending section of the sheet-like member of the bed cover of aspect 6 has a stretchable property, even when a pet has stepped onto the bed and force acts causing the bed cover to be pulled to the outer side in the horizontal surface direction of the bed cover, the extending section that has a stretchable property buffers the force so that it is not transmitted to the block body being held in the bed cover, and displacement or detachment of the block body from the frame body is even less likely to occur.

According to another aspect (aspect 7) of the invention, in the bed cover of aspect 6, the extending section of the sheet-like member has a stretching part with a stretchable property, and a low stretching part that is adjacent to the center section and has lower stretchability than the stretching part.

Since the extending section of the sheet-like member in the bed cover of aspect 7 has a stretching part with a stretchable property and a low stretching part that is adjacent to the center section and has lower stretchability than the stretching part, it can exhibit the same effect as claim 6 described above, while also, even when a pet has stepped onto the bed and force acts causing the bed cover to be pulled to the outer side in the horizontal surface direction of the bed cover, the force is more likely to act over the entire center section surrounded by the low stretching part of the sheet-like member (i.e., it is less likely to act on only one part of the center section), such that the block body is less likely to turn upward from the frame body and become displaced or detached.

Incidentally, when the low stretching part is formed by stitched sections or joining sections of a plurality of sheet parts composing the sheet-like member, it will be visible from the first surface side (i.e., the outer surface side), thus providing an advantage in that when the bed cover holding the block body is fitted onto the frame body, the low stretching part adjacent to the center section of the sheet-like member serves as a mark to facilitate positioning of the block body.

According to another aspect (aspect 8) of the invention, in the bed cover of aspects 1 to 7, the attachment member is an elastic member that allows the outer edge of the sheet-like member to be stretched.

Since the attachment member of the bed cover of aspect 8 is an elastic member that allows the outer edge of the sheet-like member to be stretched, the bed cover can be easily attached to the pet bed, and the bed cover can be more reliably anchored to the pet bed using the entire outer edge of the sheet-like member. Thus, in the bed cover of aspect 8, the block body is even less likely to be displaced or detached from the frame body together with the bed cover.

Advantageous Effects of Invention

According to the invention it is possible to provide a bed cover that, when fitted onto a pet bed having a frame body and a block body detachably inserted into the frame body, is unlikely to have the block body become displaced or detached from the frame body.

DESCRIPTION OF EMBODIMENTS

Figure 1:
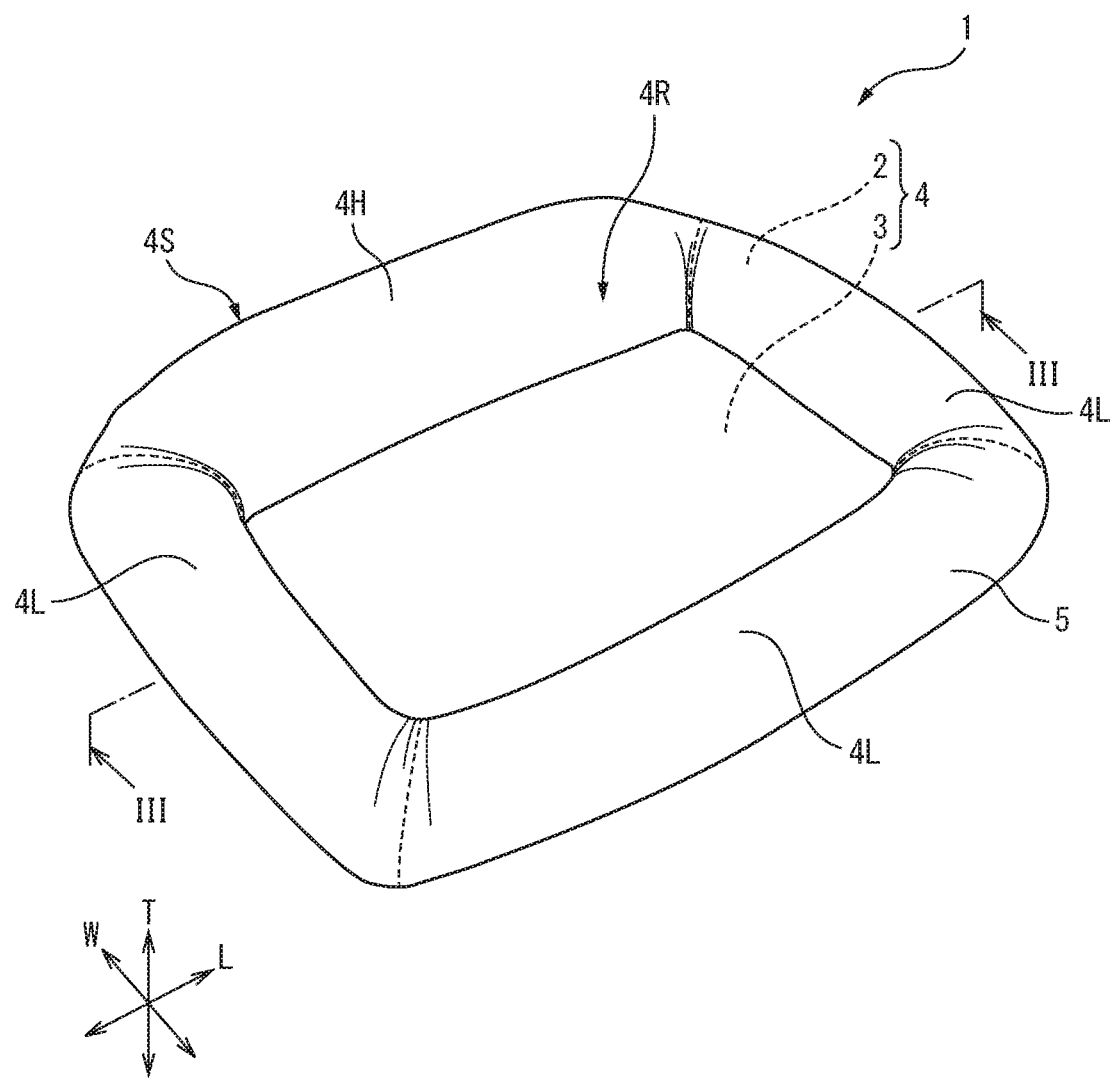
FIG. 1 is a perspective view of a pet bed fitted with a bed cover, according to an embodiment of the invention.

Preferred embodiments of the bed cover of the invention will now be explained in greater detail with reference to the accompanying drawings. Throughout the present description, unless otherwise specified, the concept of "an object (for example, a bed cover or pet bed) situated on the horizontal plane in the extended state, being viewed in the thickness direction of the object from the top side in the vertical direction" will be referred to simply by the phrase "in the planar view", and a drawing in the planar view will be referred to as a "plan view".

The directions used throughout the present description are as follows, unless otherwise specified.

Throughout the present description, "widthwise direction W" refers to the "short direction of the lengths of a longitudinal object in the planar view", "lengthwise direction L" refers to the "long direction of the lengths of a longitudinal object in the planar view", and "thickness direction" refers to the "vertical direction of an object situated on the horizontal plane in the expanded state", with the widthwise direction W, lengthwise direction L and thickness direction being in a mutually perpendicular relationship. Also throughout the present description, the concept of "the side of a longitudinal object (for example, a bed cover or pet bed) on the horizontal plane in the extended state, which is relatively near the intersection (the center point) between the widthwise center axis line running in the lengthwise direction L and the lengthwise center axis line running in the widthwise direction W" will be referred to as the "inner side in the horizontal surface direction", and the concept of "the side of a longitudinal object (for example, a bed cover or pet bed) on the horizontal plane in the extended state, which is relatively distant from the intersection (the center point) between the widthwise center axis line running in the lengthwise direction L and the lengthwise center axis line running in the widthwise direction W" will be referred to as the "outer side in the horizontal surface direction". Incidentally, unless otherwise specified, the term "height" used throughout the present description means the distance from the horizontal plane as the reference plane, for an object (for example, a pet bed) situated on the horizontal plane.

Moreover, unless otherwise specified, the concept of "the side relatively distant from the mounting side of the pet bed when the pet bed is used", in the thickness direction of the pet bed (including the pet bed fitted with the bed cover), will be referred to herein as the "top side", and the concept of "the side relatively near the mounting side of the pet bed when the pet bed is used" will be referred to herein as the "back side" or "bottom side". Furthermore, the surface of the bed cover or the sheet-like member forming the bed cover, as the side exposed to the exterior when it is fitted onto the pet bed, will be referred to as the "outer surface", and the surface on the side opposite the outer surface, which is the side contacting the pet bed to be fitted, will be referred to as the "back side".

Figure 2:
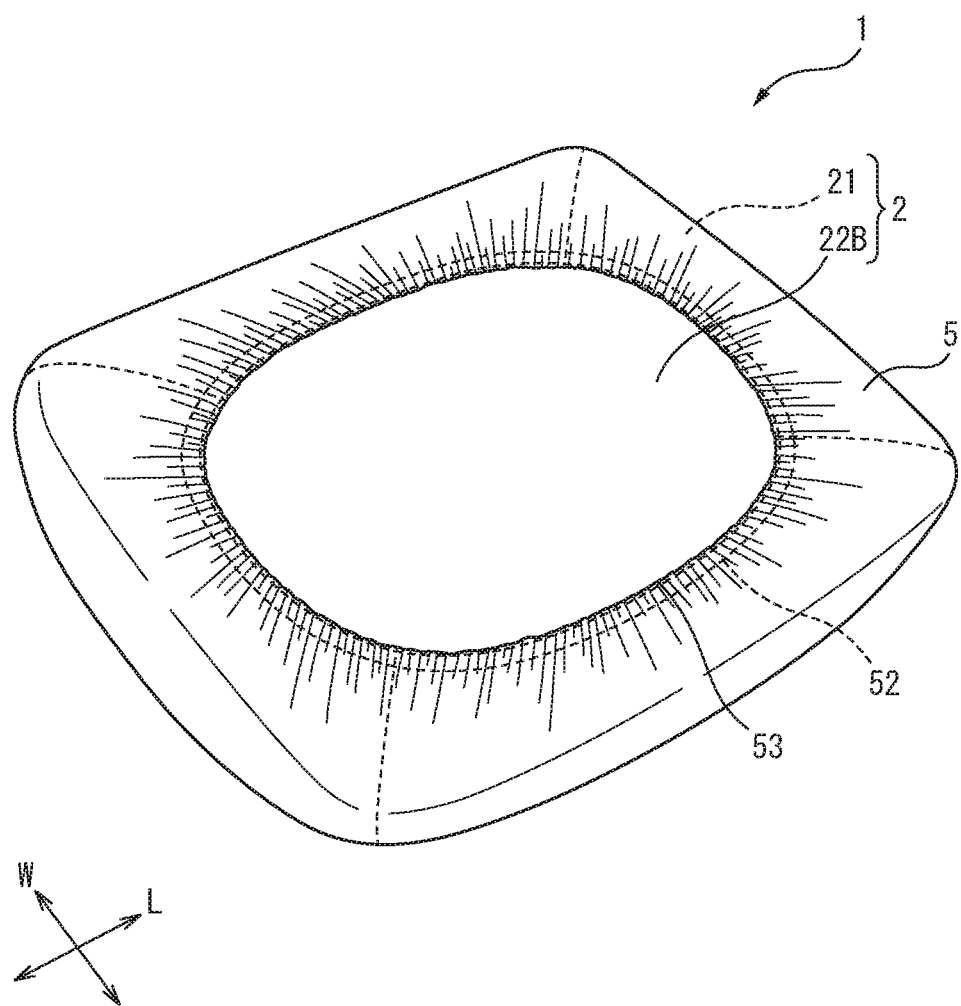
FIG. 2 is a perspective view of the back side (mounting side) of a pet bed fitted with a bed cover, according to an embodiment of the invention.
Figure 3:
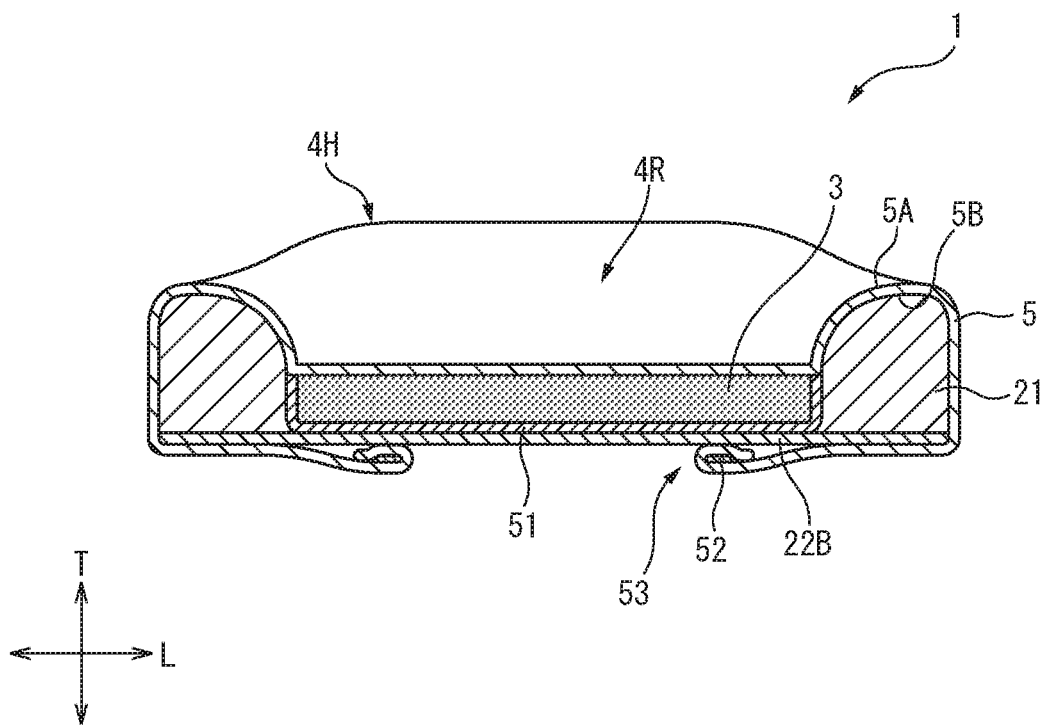
FIG. 3 is a cross-sectional view along line of FIG. 1.

FIG. 1 is a perspective view of a pet bed 1 fitted with a bed cover 5 according to an embodiment of the invention, and FIG. 2 is a perspective view of its back side (mounting side). FIG. 3 is a cross-sectional view along line of FIG. 1.

As shown in FIG. 1 and FIG. 2, the pet bed 1 fitted with the bed cover 5 according to the embodiment of the invention has a rounded longitudinal, essentially rectangular outer shape with a lengthwise direction L and a widthwise direction W, in the planar view. According to the invention, the outer shape of the pet bed in the planar view is not limited to the shape of this embodiment, and any desired shape (such as circular, elliptical, square, triangular or star-shaped) may be employed, depending on the size of the pet and the desired design property. The size of the pet bed 1 may be appropriately selected depending on the size and type of pet that will use the bed, and if the pet is a small or medium-sized dog, the length in the lengthwise direction L will be about 400 mm to 1400 mm and the length in the widthwise direction W will be about 250 mm to 1200 mm.

Throughout the present description, the pet bed that is not fitted with the bed cover will also be referred to as the main bed body.

As shown in FIG. 1 to FIG. 3, the pet bed 1 is constructed with a main bed body 4 comprising a rim-like frame body 2 running on all sides of an essentially rectangular shape in the planar view and having a lengthwise direction L, a widthwise direction W and a thickness direction T, and an essentially cuboid block body 3 having a cushioning property, inserted in a freely detachable manner in the frame body 2, the main bed body 4 being covered by a bed cover 5 from the top side to part of the back side. The bed cover 5 holds the block body 3 by a housing member 51, described below, while covering the entire main bed body 4 (the frame body 2 and block body 3) from the top side to part of the back side, and as shown in FIG. 2, on the back side of the main bed body 4, the perimeter edge 53 of the bed cover 5 is anchored to the main bed body 4 (specifically to the frame body 2) by contraction caused by contractive force of an elastic filament 52 (for example, a rubber string) (i.e., the opening formed by the perimeter edge 53 of the bed cover 5 is reduced in diameter). Throughout the present description, the term "anchored" is not a term meaning the strict absence of any movement, but is instead used to include states in which a certain degree of movement is possible, considering that a bed cover or pet bed is a soft or deformable article.

As shown in FIG. 1 and FIG. 3, the pet bed 1 constructed in this manner has the perimeter portion 4S of the main bed body 4 rising toward the top side (at a higher height) by the frame body 2, while the center section surrounded by the perimeter portion 4S is constructed as a recess 4R hollowed toward the back side. On the back side of the bottom face of the recess 4R there is disposed a block body 3 having a cushioning property, that is able to support the body of the pet while diffusing the body pressure of the pet on the bottom face of the recess 4R. The pet therefore lies down in the recess 4R as a sleeping area, resting in the recess 4R.

Also, the perimeter portion 4S of the main bed body 4 has a rim-like shape in the planar view, running along each side of an essentially rectangular shape, similar to the frame body 2 described above, but as shown in FIG. 1, one of the four sides forming the perimeter portion 4S is formed as a main bed body high part 4H that rises further upward (to a higher height) than the other sides, allowing it to function as a back rest for the pet that is lying down in the recess 4R. Also, 3 of the four sides forming the perimeter portion 4S are formed as main bed body low parts 4L with lower heights than the aforementioned main bed body high part 4H, facilitating entry and exit of the pet into the recess 4R, while also functioning as a pillow that allows resting of the head of the pet lying down in the recess 4R.

The pet bed to which the bed cover of the invention is applied is not limited to such a construction, and for example, the perimeter portion of the main bed body may have two of the four sides formed as main bed body high parts with higher heights, or all of the four sides may have the same height. Moreover, when the shape of the perimeter portion of the main bed body in the planar view is circular, part of the circular perimeter portion may be formed as the main bed body high part with a higher height.

The pet bed 1 is used with the recess 4R facing upward, as shown in FIG. 1, at a prescribed location in the pet's living space (for example, indoors), allowing the pet to freely enter and exit the recess 4R for resting. Incidentally, the pet bed 1 may be set directly on the floor surface or ground of the living space, or it may be set via a prescribed holder, mat or the like.

The pet that is to use the pet bed in which the bed cover of the invention is applied is not particularly restricted so long as it is an animal that can be raised as a pet, and it may be any of various animals including mammals such as dogs, cats and rabbits, or reptiles such as snakes, or amphibians, among which animals that have the habit of scratching the ground or floor surface and digging holes (for example, dogs, cats and rabbits) are most particularly suitable.

Figure 4A:
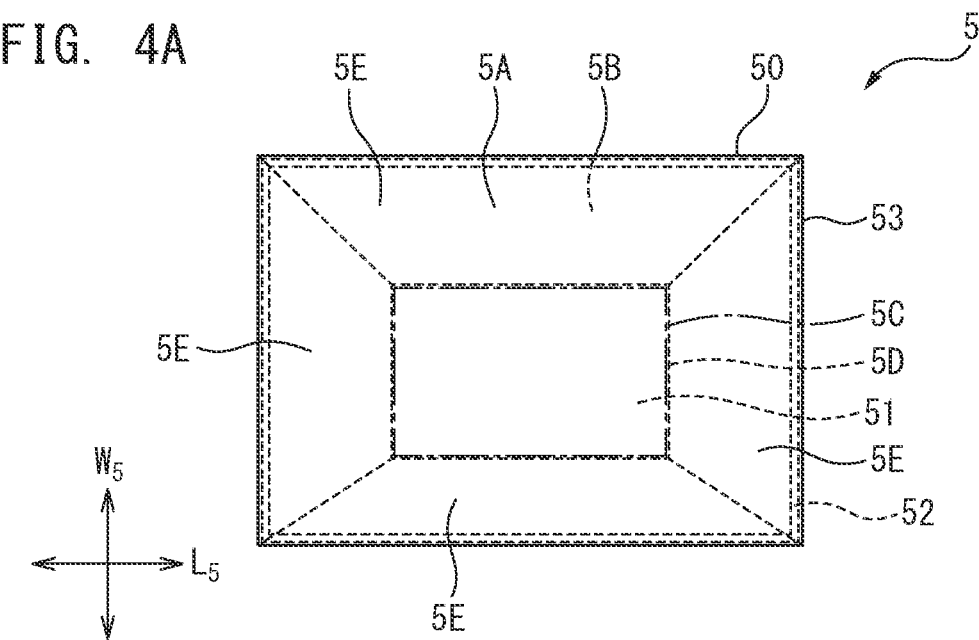
FIG. 4A is a plan view of the outer surface side of a bed cover according to an embodiment of the invention, in the extended state.

The bed cover 5 to be fitted in the pet bed (main bed body 4) will now be described. FIG. 4A is a plan view of the outer surface side of a bed cover 5 according to an embodiment of the invention, in the extended state, and FIG. 4B is a plan view of the back side of a bed cover 5 according to an embodiment of the invention in the extended state.

Figure 4B:
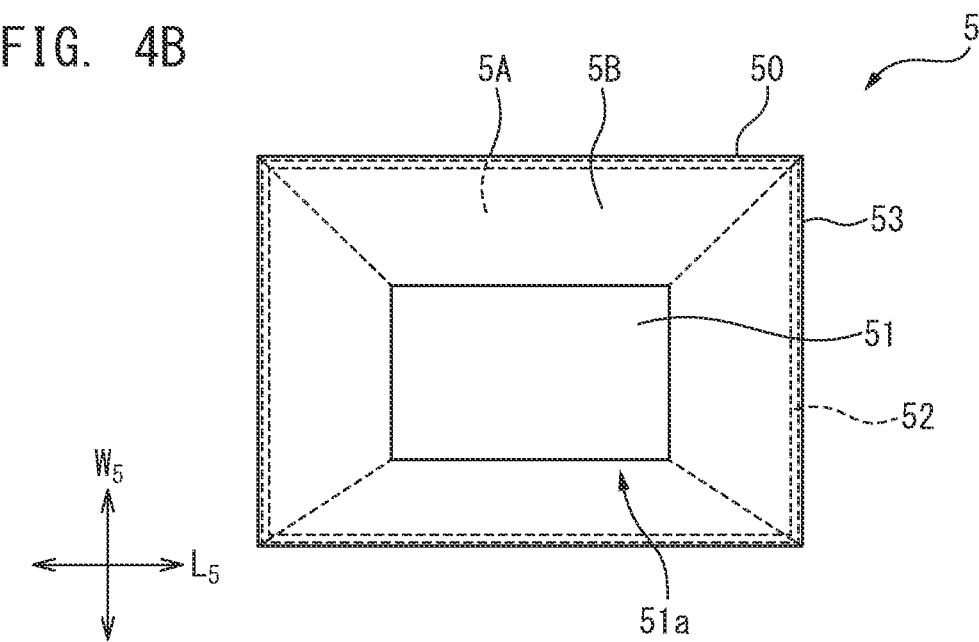
FIG. 4B is a plan view of the back side of a bed cover according to an embodiment of the invention in the extended state.

The bed cover 5 of this embodiment is a bed cover for fitting onto a pet bed (specifically a main bed body 4) having a frame body 2 and a block body 3 detachably inserted into the frame body 2, the bed cover 5 comprising, as shown in FIG. 3, FIG. 4A and FIG. 4B, a sheet-like member 50 which has a first surface 5A forming the outer surface and a second surface 5B on the opposite side from the first surface 5A, when fitted onto the pet bed, the sheet-like member 50 having, in the plan view in the extended state, a center section 5C located at approximately the center of the bed cover 5 and an extending section 5E extending from the center section 5C in a direction towards the outer edge of the sheet-like member 50, a housing member 51 which is provided on either the first surface 5A or second surface 5B of the center section 5C of the sheet-like member 50, as a holding member serving to hold the block body 3, and an elastic filament 52 which is provided at the extending section 5E of the sheet-like member 50, serving as an attachment member to allow the bed cover 5 to be attached to the frame body 2 in a freely detachable manner Since the bed cover 5 of this embodiment comprises a housing member 51 (holding member) that serves to hold the block body 3 of the pet bed, a gap is less likely to form between the bed cover 5 and the block body 3 (see FIG. 3), and the range of movement of the block body 3 (i.e., the range of displacement of the block body 3) can be restricted, thus minimizing displacement or detachment of the block body 3 from the frame body 2.

In addition, since the bed cover 5 comprises an elastic filament 52 (attachment member) for attachment of the bed cover 5 to the frame body 2 of the pet bed, the bed cover 5 is anchored to the frame body 2 of the pet bed and less likely to move, and consequently the block body 3 held by the bed cover 5 is also less likely to move (i.e., it is less likely to be displaced or detached from the frame body 2).

Thus, when the bed cover 5 of this embodiment has been fitted onto the pet bed, even if a pet such as a dog scratches the bottom face of the recess 4R of the pet bed (i.e., the outer surface on the top side of the block body 3) (due to hole-digging behavior of the pet, for example), the block body 3 is less likely to be displaced or detached from the frame body 2.

Figure 5:
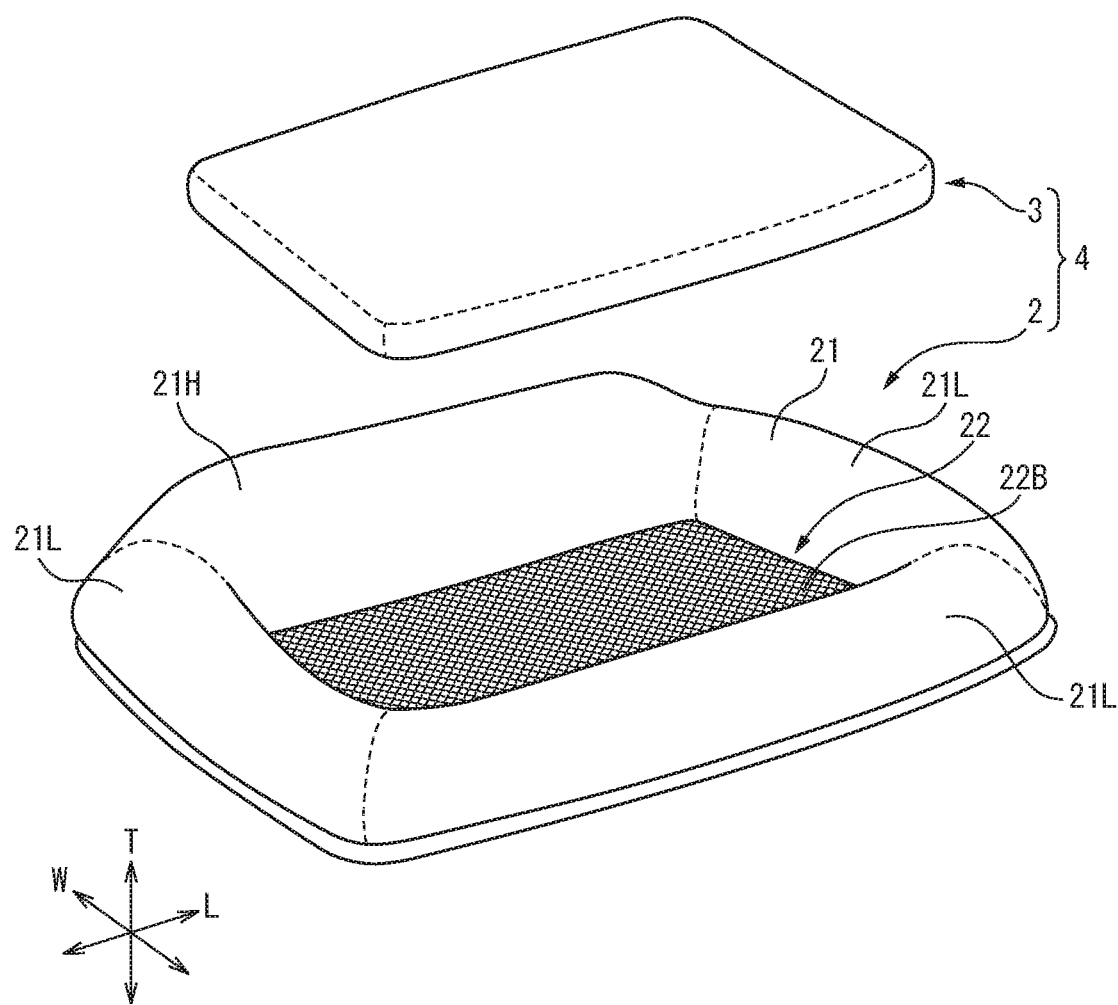
FIG. 5 is an exploded perspective view of a pet bed fitted with a bed cover of the invention.

A pet bed (main bed body) in which the bed cover of the invention is to be applied will now be described. FIG. 5 is an exploded perspective view of a pet bed fitted with a bed cover of the invention.

As shown in FIG. 5, the pet bed (main bed body 4) fitted with the bed cover of the invention is constructed with a rim-like frame body 2 running on all sides of an essentially rectangular shape in the planar view and having a lengthwise direction L, a widthwise direction W and a thickness direction T, and an essentially cuboid block body 3 having a cushioning property, inserted in a freely detachable manner in the frame body 2.

As shown in FIG. 5, the frame body 2 is constructed with a frame body portion 21 having a rim-like structure along all of the sides of an essentially rectangular shape in the planar view, and a frame body recess 22 having a bottom part 22B located on the inner side of the frame body portion 21, the frame body portion 21 having one of the four sides of the rim-like structure along all sides of the essentially rectangular shape as a frame body high part 21H with a higher height than the other sides, and when the block body 3 has been inserted in the frame body 2 (specifically, in the frame body recess 22) to form the main bed body 4, the main bed body high part 4H is formed that can function as a back support for the pet. Three of the four sides of the frame body portion 21 are formed as frame body low parts 21L with lower heights than the frame body high part 21H, and when the block body 3 has been inserted in the frame body 2 to form the main bed body 4, the main bed body low part 4L is formed that can function as a pillow allowing the pet to rest its head.

The members and materials composing the frame body portion 21 are not particularly restricted, and for example, any one known in the relevant field may be employed, like a cushion material such as urethane foam or foamed beads covered with a fabric. The frame body portion 21 may be constructed of an integral body having the aforementioned rim-like structure, or it may be constructed of a combination of different structures (for example, 4 essentially straight linear structures).

In the frame body recess 22 surrounded by the frame body portion 21, as shown in FIG. 3 and FIG. 5, the bottom part 22B is formed by a mesh fabric (for example, a woven fabric or knitted fabric composed of synthetic fibers) that is continuous from the back side of the frame body portion 21, ensuring air permeability so that air is not impeded by the block body 3 inserted in the frame body recess 22. The mesh fabric is attached across the entire back side of the frame body portion 21.

The block body 3, as shown in FIG. 5, is constructed of an essentially cuboid cushion material having a lengthwise direction L, a widthwise direction W and a thickness direction T, and is situated at a location corresponding to the bottom face of the recess 4R forming the sleeping area of the pet bed, allowing the body of the pet to be supported while diffusing the body pressure of the pet across the inside of the recess 4R. The length of the block body 3 in each direction (i.e., the size of the cuboid) is not particularly restricted so long as it is a size allowing the body of the pet to be supported across the inside of the recess 4R, and any desired size may be employed.

The material composing the block body 3 is also not particularly restricted so long as it allows the block body to function as a cushion material, and for example, an urethane foam or a web-like fiber structure made of a thermoplastic resin may be used. Among these, from the viewpoint of having excellent cushioning property with high repulsion, and excellent performance in terms of air permeability, water permeability and durability, the block body preferably employs a web-like fiber structure made of thermoplastic resin. Such a web-like fiber structure is a structure in which a fibrous thermoplastic resin forms a plurality of loops while being entangled in a disordered manner and joined together by heat fusion. The thermoplastic resin forming the web-like fiber structure may be a polyester-based resin, polyamide-based resin, polyether-based resin or polyolefin-based resin, for example.

Figure 6A:
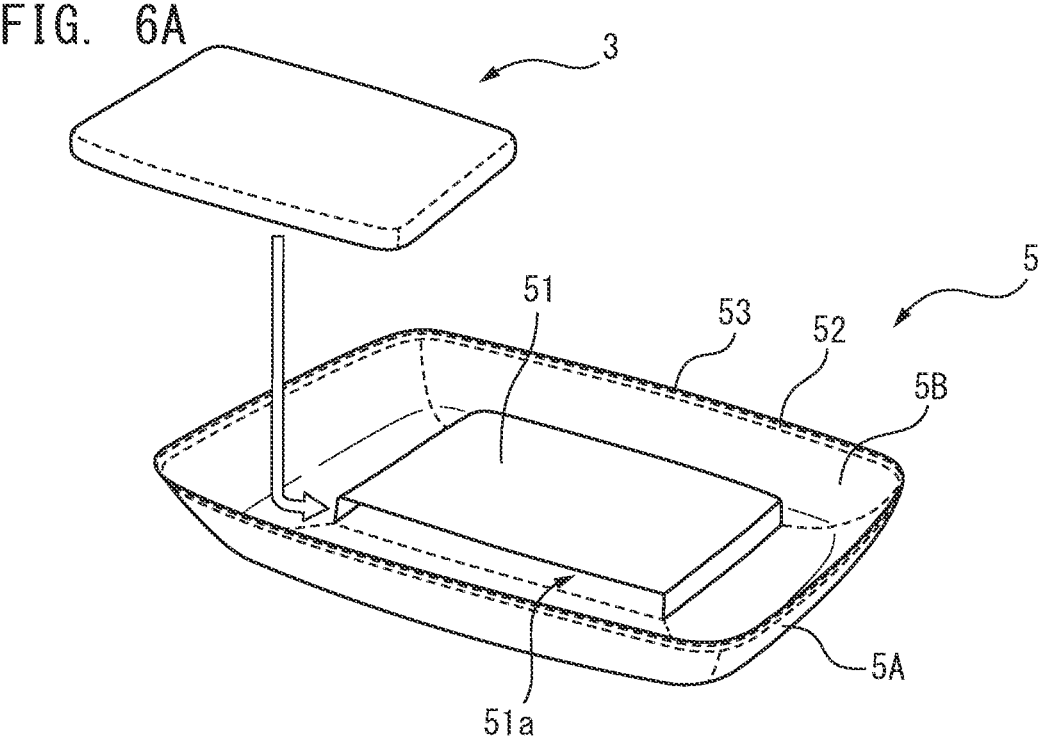
FIG. 6A and FIG. 6B are diagrams for illustration of a method of fitting a pet bed cover according to an embodiment of the invention onto a pet bed.
Figure 6B:
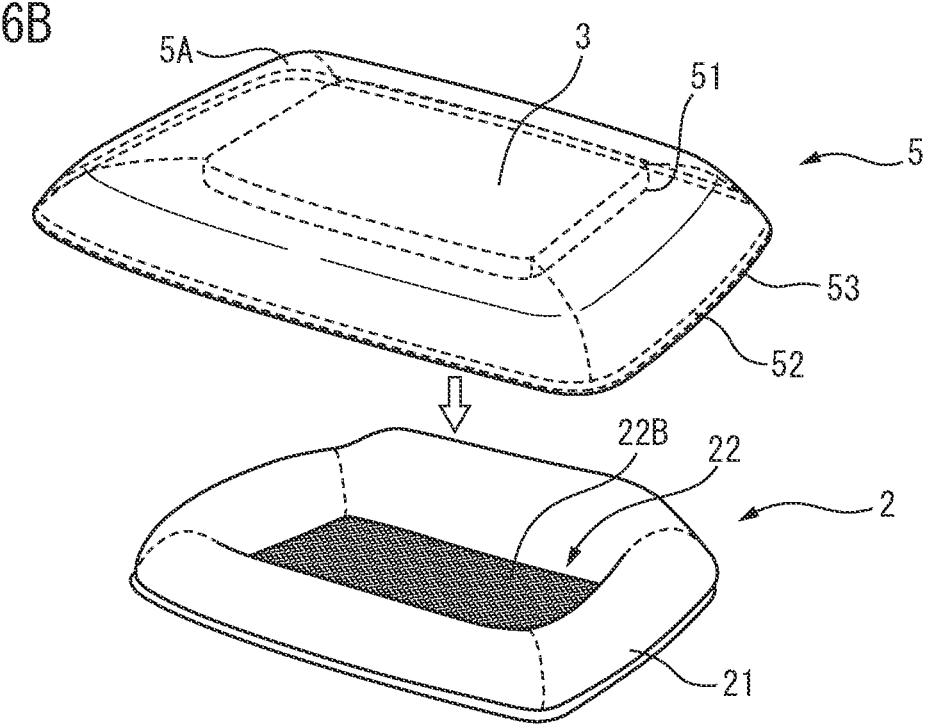

The method of fitting the bed cover 5 onto the pet bed (main bed body 4) is not particularly restricted, and the bed cover 5 may be fitted in the following manner, as an example. FIG. 6A and FIG. 6B are diagrams for illustration of a method of fitting a pet bed cover 5 according to an embodiment of the invention onto a pet bed.

When fitting the bed cover 5 onto the pet bed (main bed body 4), as shown in FIG. 6A, first the block body 3 of the pet bed is housed in the housing member 51 (holding member) provided on the second surface 5B of the sheet-like member 50 of the bed cover 5, to hold the block body 3 in the bed cover 5. Next, as shown in FIG. 6B, the second surface 5B of the sheet-like member 50 of the bed cover 5 is oriented facing downward, and the block body 3 housing the housing member 51 of the bed cover 5, together with the housing member 51, is inserted into the frame body recess 22 of the frame body 2 of the pet bed. The elastic filament 52 provided in the extending section 5E of the sheet-like member 50 of the bed cover 5 is stretched (i.e., the opening formed by the perimeter edge 53 of the bed cover 5 is widened), while running the extending section 5E along the front side of the frame body 2 of the pet bed and moving the perimeter edge 53 of the bed cover 5 to the back side of the frame body 2 (i.e., the back side of the pet bed), after which the stretched state of the elastic filament 52 is released and the contractive force of the elastic filament 52 causes the opening to be reduced in diameter due to the perimeter edge 53 of the bed cover 5, thereby allowing the bed cover 5 to be fitted onto the pet bed.

A bed cover of the invention will now be explained.

As mentioned above, the bed cover 5 according to an embodiment of the invention comprises a sheet-like member 50 which has a first surface 5A and a second surface 5B, the sheet-like member 50 having, in the plan view in the extended state, a center section 5C located at approximately the center of the bed cover 5 and an extending section 5E extending from the center section 5C in a direction towards the outer edge of the sheet-like member 50 (i.e., the perimeter edge 53 of the bed cover 5), a housing member 51 which is provided on either the first surface 5A or second surface 5B of the center section 5C of the sheet-like member 50, as a holding member serving to hold the block body 3, and an elastic filament 52 which is provided at the extending section 5E of the sheet-like member 50, serving as an attachment member to allow the bed cover 5 to be attached to the frame body 2 in a freely detachable manner Each of the members forming the bed cover of the invention will now be explained in detail with reference to the bed cover 5 according to the embodiment described above.

[Sheet-Like Member]

As explained above, the sheet-like member 50, as a major constituent element of the bed cover 5, is an essentially rectangular sheet-like member having a lengthwise direction $L_5$ and a widthwise direction $W_5$ in the plan view in the extended state, as shown in FIG. 4A, and it has a center section 5C located at approximately the center of the bed cover 5, and an extending section 5E that extends from the center section 5C in the direction toward the outer edge of the sheet-like member 50 (i.e., the perimeter edge 53 of the bed cover 5). The center section 5C and extending section 5E may be constructed of a single sheet-like member, or it may be constructed of a composite sheet-like member joined by stitching together one sheet part forming the center section 5C and one or more sheet parts forming the extending section 5E.

The sheet-like member 50 shown in FIG. 4A and FIG. 4B are constructed of a composite sheet-like member in which a single sheet part forming the center section 5C and 4 sheet parts forming the extending section 5E are joined by stitching (5D in FIG. 4A indicates the stitched section (line)), and as shown in FIG. 4A, the center section 5C is disposed at a location slightly shifted toward one long side of the sheet-like member 50 which has an essentially rectangular shape (the lower side in FIG. 4A). With such a layout for the center section 5C, the extending section 5E corresponding to the frame body high part 21H (the extending section 5E on the top side of the FIG. 4A) is formed wider so as to completely cover the frame body high part 21H. Thus, the center section 5C does not need to be located exactly at the center of the sheet-like member, and instead its location may be displaced from the center of the sheet-like member depending on the structure of the frame body 2 of the main bed body 4, or in other words, it is sufficient if it is located relatively toward the center with respect to the extending section.

The sheet-like member (including the sheet part forming the center section and the sheet part forming the extending section) is not particularly restricted so long as it can be used as the base material for a bed cover, and any of various sheet-like members may be employed such as a woven fabric, knitted fabric, nonwoven fabric, leather, synthetic leather or a resin sheet, for example; however, from the viewpoint of softness, air permeability, ease of maintenance (easy washability) and strength, it is preferred to use a fiber sheet such as a woven fabric or knitted fabric. When the sheet-like member is such a fiber sheet, the constituent fibers are not particularly restricted, and any fibers such as synthetic fibers (such as polyester fiber or nylon fiber), natural fibers (such as cotton or silk), regenerated fibers (such as rayon or cupra) or semisynthetic fibers (such as acetate fibers) may be used.

According to the invention, the center section of the sheet-like member preferably has a stretchable property. If the center section of the sheet-like member has a stretchable property, then even when a pet has stepped onto the bed and force acts on the bed cover, causing the bed cover to be pulled to the outer side in the horizontal surface direction of the bed cover, the center section that has a stretchable property will buffer the force so that it is not transmitted to the block body being held in the bed cover, and displacement or detachment of the block body from the frame body will be even less likely to occur.

Also according to the invention, the extending section of the sheet-like member preferably has a stretchable property. If the extending section of the sheet-like member has a stretchable property, then even when a pet has stepped onto the bed and force acts on the bed cover, causing the bed cover to be pulled to the outer side in the horizontal surface direction of the bed cover, the extending section that has a stretchable property will buffer the force so that it is not transmitted to the block body being held in the bed cover, and displacement or detachment of the block body from the frame body will be even less likely to occur.

Moreover, according to the invention, the extending section of the sheet-like member preferably has a stretching part with a stretchable property, and a low stretching part that is adjacent to the center section and has lower stretchability than the stretching part. There are no particular restrictions on the form of the low stretching part, and for example, the low stretching part may be formed of a stitched section 5D (joining section) between one sheet part forming the center section 5C and four sheet parts forming the extending section 5E, as in the embodiment described above, or a prescribed region of the extending section 5E may be formed of a low stretchable material so as to enclose the center section 5C. If the extending section of the sheet-like member has a stretching part with a stretchable property and a low stretching part that is adjacent to the center section and has lower stretchability than the stretching part, then the extending section can exhibit the effect by the stretchable property of the extending section, while as an additional advantage, even when a pet has stepped onto the bed and force acts causing the bed cover to be pulled to the outer side in the horizontal surface direction of the bed cover, the force is more likely to act over the entire center section surrounded by the low stretching part of the sheet-like member (i.e., it is less likely to act on only one part of the center section), such that the block body held by the bed cover is less likely to turn upward from the frame body and become displaced or detached.

Incidentally, when the low stretching part of the extending section is formed by stitched sections or joining sections of a plurality of sheet parts composing the sheet-like member, as in the embodiment described above, the low stretching part enclosing the center section is visible from the first surface side (i.e., the outer surface side), thus providing an advantage in that when the bed cover holding the block body is fitted onto the frame body, the low stretching part enclosing the center section of the sheet-like member serves as a mark to facilitate positioning of the block body.

[Holding Member]

As mentioned above, in the bed cover 5 of this embodiment, the housing member 51 for holding of the block body 3 of the pet bed (main bed body 4) is provided with a second surface 5B at the center section 5C of the sheet-like member 50, as shown in FIG. 3, FIG. 4B, FIG. 6A and FIG. 6B. For this embodiment, as shown in FIG. 4B and FIG. 6A, the housing member 51 is a pocket having an opening 51a and a housing space that is continuous from the opening 51a, and it is constructed so that the block body 3 inserted through the opening 51a can be firmly held in the housing space. In the bed cover of the invention, the holding member that serves to hold the block body is not particularly restricted so long as it can hold the block body, and any desired member may be employed such as a rubber band provided on the first surface or second surface of the sheet-like member, or engaging means (such as a button and button hole, a mechanical fastener or a tightening string) provided on both the first surface or second surface of the sheet-like member and the front side of the block body, for example, but it is most preferred to employ a housing member with an opening for housing of the block body (for example, a pocket), as for this embodiment. If the holding member of the bed cover is this type of housing member it will be possible to more reliably hold the block body, and therefore the block body will be even less likely to separate from the bed cover and be displaced or detached from the frame body.

Furthermore, in the bed cover of the invention, when the holding member is a housing member having an opening, the housing member is more preferably a stretchable housing member. If the holding member is a stretchable housing member (for example, a stretchable pocket), it can exhibit an effect by the holding member being a housing member, while also, even when a pet has stepped onto the bed and force acts on the bed cover causing the bed cover to be pulled to the outer side in the horizontal surface direction of the bed cover, the stretchable housing member stretches, buffering the force so that it is not transmitted to the block body being held in the bed cover, and helping to more reliably prevent displacement or detachment of the block body from the frame body.

Moreover, in the bed cover of the invention, the holding member may be provided on either the first surface or the second surface of the sheet-like member; however, preferably the holding member is provided on the second surface at the center section of the sheet-like member, as for this embodiment. If the holding member is provided on the second surface at the center section of the sheet-like member, then even when a pet has stepped onto the bed (especially onto the outer surface on the top side of the frame body) and the bed cover has been pulled to the outer side in the horizontal surface direction of the bed cover, force in the direction of detachment from the frame body (the upward direction) will be less likely to be generated on the block body held by the bed cover and displacement or detachment of the block body from the frame body will be even less likely to occur. Furthermore, when the bed cover has been fitted onto the pet bed (main bed body), the outer surface on the top side of the bed is formed by the first surface of the center section and extending section of the sheet-like member forming the bed cover, and the groove-like border section between the frame body and the block body forming the bed is not exposed on the outer surface, so that even when a pet has scratched the outer surface on the top side of the bed, the claws of the pet are less likely to enter the groove-like border section, and displacement or detachment of the block body from the frame body can be more reliably prevented.

In the bed cover of the invention, the structure and size of the holding member (including the housing member) are not particularly restricted so long as they allow the block body to be held in the sheet-like member, and any desired structure and size may be employed, but preferably a structure and size are employed that make gaps unlikely to form between the sheet-like member and the block body. If gaps are unlikely to form between the sheet-like member and the block body, the range of movement of the block body can be restricted and displacement or detachment of the block body from the frame body will be even less likely to occur.

In the bed cover of the invention, the material forming the holding member (including the housing member) is not particularly restricted so long as it can firmly hold the block body in the sheet-like member, and for example, the same material as the sheet-like member described above may be used.

[Attachment Member]

As explained above, the bed cover 5 of this embodiment comprises an elastic filament 52 as an attachment member for attachment of the bed cover 5 to the frame body 2 in a freely detachable manner, provided in the extending section 5E of the sheet-like member 50 (more specifically, near the outer edge of the sheet-like member 50), as shown in FIG. 2, FIG. 4A, FIG. 4B, FIG. 6A and FIG. 6B. The elastic filament 52 is an elastic member (for example, a rubber string or elastic sheet) that renders the outer edge of the sheet-like member 50 stretchable, and as shown in FIG. 2, contractive force of the elastic filament 52 allows the bed cover 5 to be anchored to the main bed body 4 (specifically to the frame body 2) by contraction of the perimeter edge 53 of the bed cover 5 on the back side of the main bed body 4 (i.e., the opening formed by the perimeter edge 53 of the bed cover 5 is reduced in diameter). If the attachment member of the bed cover is thus an elastic member that allows the outer edge of the sheet-like member to be stretched, the bed cover can be easily attached to the pet bed (main bed body), and the bed cover can be more reliably anchored to the pet bed (main bed body) using the entire outer edge of the sheet-like member, thus providing an advantage in that the block body will be even less likely to be displaced or detached from the frame body together with the bed cover.

In the bed cover of the invention, the structure and size of the attachment member (including the elastic member) and the materials forming it are not particularly restricted so long as they allow the bed cover to be attached to the pet bed (main bed body), and any desired structure, size and materials may be employed; however, preferably a structure, size and materials are employed that reduce the likelihood of displacement and movement of the bed cover with respect to the main bed body. If displacement and movement of the bed cover with respect to the main bed body is unlikely, then the block body held in the bed cover will be even less likely to be displaced or detached from the frame body together with the bed cover.

In the bed cover of the invention, the attachment member may be, instead of the elastic filament 52 of the embodiment described above, an attachment member of any of the types illustrated in FIG. 7A to FIG. 7D, for example. FIG. 7A, FIG. 7B, FIG. 7C and FIG. 7D are a set of perspective views of the back sides of different pet beds 10 to 13, each having a bed cover according to a different embodiment of the invention attached with a different type of attachment member.

Figure 7A:
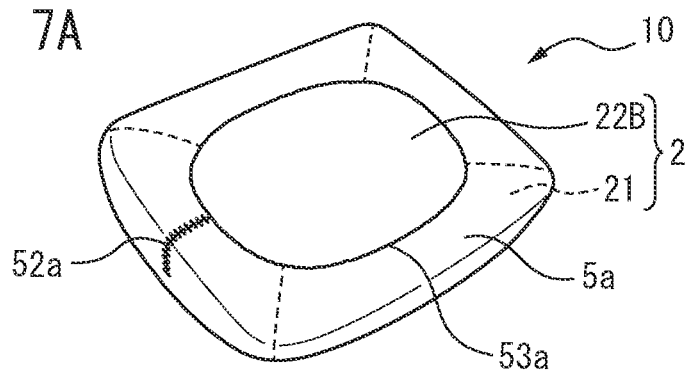
FIG. 7A, FIG. 7B, FIG. 7C and FIG. 7D are a set of perspective views of the back sides of different pet beds, each having a bed cover according to a different embodiment of the invention attached with a different type of attachment member.

For example, the bed cover 5*a* according to another embodiment of the invention comprises a fastener 52*a* running from the perimeter edge 53*a* of the bed cover 5*a* (i.e., the outer edge of the sheet-like member) to the inner side of the sheet-like member, as shown in FIG. 7A. With this type of fastener 52*a*, as shown in FIG. 7A, the fastener 52*a* is tightened on the back side of the main bed body to contract the perimeter edge 53*a* of the bed cover 5*a* (i.e., to reduce the diameter of the opening formed by the perimeter edge 53*a* of the bed cover 5*a*), thus allowing the bed cover 5*a* to be anchored to the main bed body (specifically the frame body 2). If the attachment member is constructed with this type of fastener, the opening formed by the perimeter edge of the bed cover (specifically the opening diameter) will be less likely to deform when the bed is used and the bed cover will be less likely to move with respect to the main bed body, thus providing the advantage of allowing the bed cover to be more reliably anchored with respect to the main bed body.

Figure 7B:
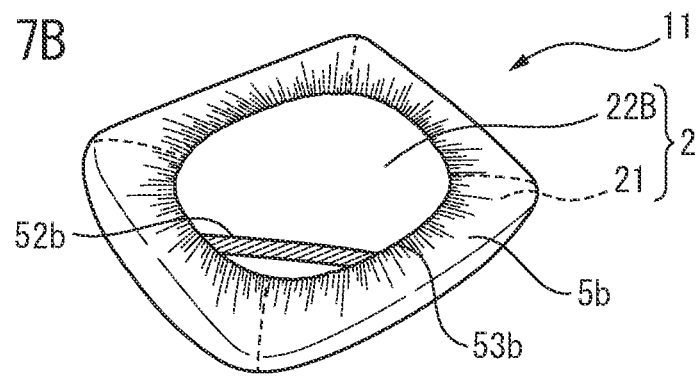
Figure 7C:
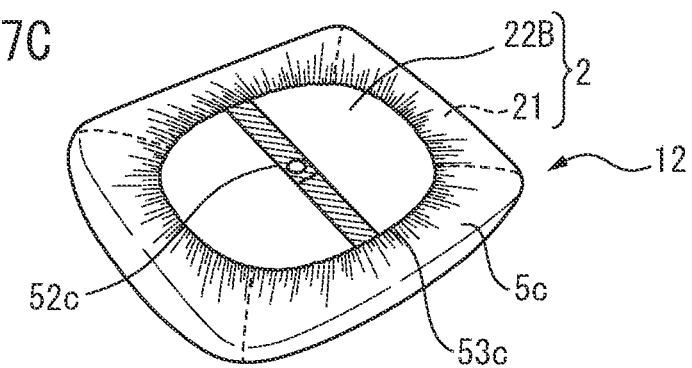

The bed cover 5*b* according to yet another embodiment of the invention comprises a rubber band 52*b* that runs from a part of the perimeter edge 53*b* of the bed cover 5*b* (i.e., the outer edge of the sheet-like member) to another part of the perimeter edge 53*b*, as shown in FIG. 7B. Similarly, the bed cover 5*c* according to yet another embodiment of the invention, shown in FIG. 7C, comprises engaging means 52*c* having a belt-like strip provided with a button that runs from a prescribed part of the perimeter edge 53*c* of the bed cover 5*c* (i.e., the outer edge of the sheet-like member) to the outer side of the sheet-like member, and a belt-like strip provided with a button hole that runs from a prescribed part of the perimeter edge 53*c* to the outer side of the sheet-like member and faces the belt-like strip provided with a button. As shown in FIG. 7B and FIG. 7C, on the back side of the main bed body, the rubber band 52*b* and engaging means 52*c* cause contraction of the perimeter edges 53*b* and 53*c* of the bed covers 5*b* and 5*c*, respectively, by contractive force of the rubber band 52*b* and engagement of the engaging means 52*c*, respectively (i.e., they reduce the diameter of the openings formed by the perimeter edges 53*b* and 53*c* of the bed covers 5*b* and 5*c*), allowing the bed covers 5*b* and 5*c* to be anchored to the main bed body (specifically the frame body 2). If the attachment member is constructed with this type of rubber band or engaging means, the attachment member will partially plug the opening formed by the perimeter edge of the bed cover, as shown in FIG. 7B and FIG. 7C, so that the bed cover will be less likely to become detached from the main bed body, thus providing the advantage of allowing the bed cover to be more reliably anchored with respect to the main bed body.

Figure 7D:
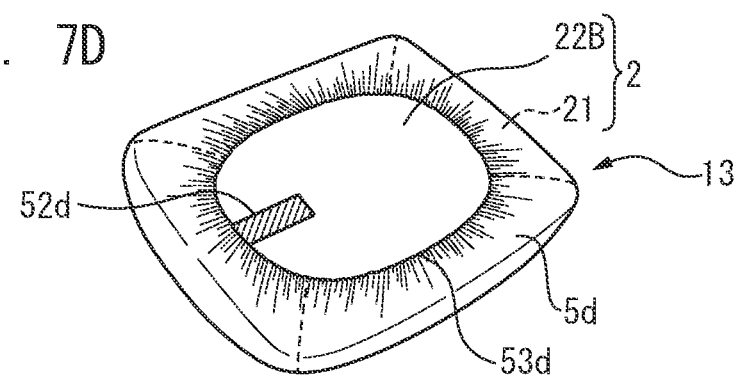

The bed cover 5*d* according to yet another embodiment of the invention, shown in FIG. 7D, has a protruding strip 52*d* extending from a prescribed part of the perimeter edge 53*d* of the bed cover 5*d* (i.e., the outer edge of the sheet-like member) to the outer side of the sheet-like member, the protruding strip 52*d* comprising a structural element (for example, a portion made of a material with a large frictional coefficient, such as rubber, or an irregular structure) that can produce frictional force with the main bed body, on the contact surface with the main bed body. In such a protruding strip 52*d*, the structural element that can produce frictional force contacts with the main bed body on the back side of the main bed body, allowing the bed cover 5*d* to be anchored to the main bed body (specifically, to the frame body 2), as shown in FIG. 7D. If the attachment member is constructed with this type of protruding strip, the weight of the main bed body can be utilized to conveniently anchor the bed cover to the main bed body, and even if the pet moves on the bed, frictional force between the protruding strip of the bed cover and the main bed body acts more powerfully to minimize movement of the bed cover with respect to the main bed body, thereby providing the advantage of allowing the bed cover to be more reliably anchored with respect to the main bed body.

Incidentally, the bed cover of the invention is not restricted to the embodiments described above and can incorporate appropriate combinations and modifications within a range that is not outside of the object and gist of the invention. For example, the attachment member may employ an elastic member such as an elastic filament 52, in combination with another member (for example, a rubber band 52*b* or protruding strip 52*d*). The ordinal terms "first" and "second" as used throughout the present description serve merely to distinguish between the numbered embodiments and are not used to indicate any relative ordering, precedence or importance.

The invention claimed is:

1. A bed cover to be fitted onto a pet bed having a frame body and a block body detachably inserted into the frame body, the bed cover comprising:
   a sheet member including a first surface forming an outer surface and a second surface on an opposite side from the first surface, wherein when the bed cover is fitted onto the pet bed, the sheet member has, in a plan view in an extended state,
      a center section located at a center of the bed cover, and
      an extending section extending from the center section in a direction towards an outer edge of the sheet member,
   a holding member provided on either the first surface or second surface of the center section of the sheet member and configured to hold the block body, and
   an attachment member provided at the extending section of the sheet member and configured to allow the bed cover to be attached to the frame body in a freely detachable manner,
   wherein
   the extending section of the sheet member has a stretchable property, and
   the extending section of the sheet member has
      a stretching part with a stretchable property, and
      a low stretching part that is adjacent to the center section and has a lower stretchability than the stretching part.

2. The bed cover according to claim 1, wherein the holding member is provided on the second surface at the center section of the sheet member.

3. The bed cover according to claim 2, wherein the center section of the sheet member has a stretchable property.

4. The bed cover according to claim 2, wherein the holding member is a stretchable housing member for housing the block body, and the stretchable housing member has an opening for insertion of the block body.

5. The bed cover according to claim 1, wherein the holding member is a housing member for housing the block body, and the housing member has an opening for insertion of the block body.

6. The bed cover according to claim 1, wherein the attachment member is an elastic member that allows the outer edge of the sheet member to be stretched.

* * * * *